S. D. GIBSON.
Harrow.

No. 223,336. Patented Jan. 6, 1880.

WITNESSES
Robert Everett
Chas. G. Page

INVENTOR
Stephen D. Gibson
Gilmore, Smith & Co.,
ATTORNEYS

UNITED STATES PATENT OFFICE.

STEPHEN D. GIBSON, OF MARYSVILLE, OHIO.

HARROW.

SPECIFICATION forming part of Letters Patent No. 223,336, dated January 6, 1880.

Application filed September 13, 1879.

*To all whom it may concern:*

Be it known that I, STEPHEN D. GIBSON, of the village of Marysville, in the county of Union and State of Ohio, have invented certain new and useful Improvements in Harrows; and I do hereby declare that the following is a full, clear, and exact description of the construction and operation of the same, reference being had to the annexed drawings, making a part of this specification, and to the letters and figures of reference marked thereon.

Figure 1:
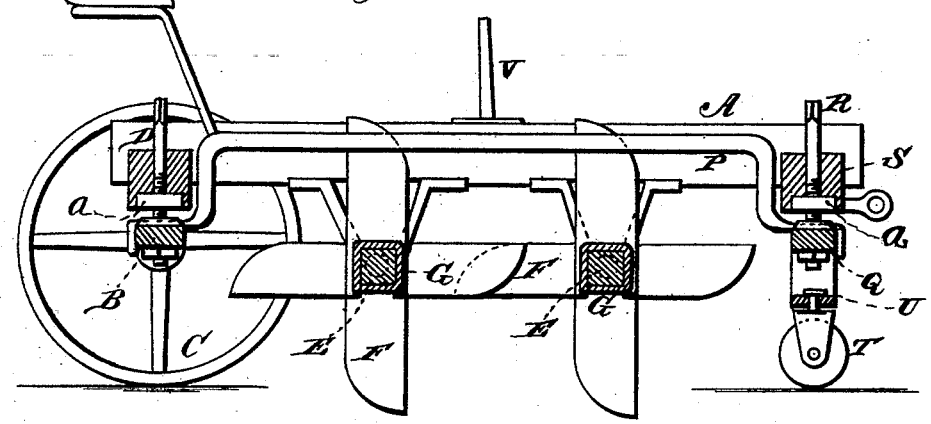
Figure 2:
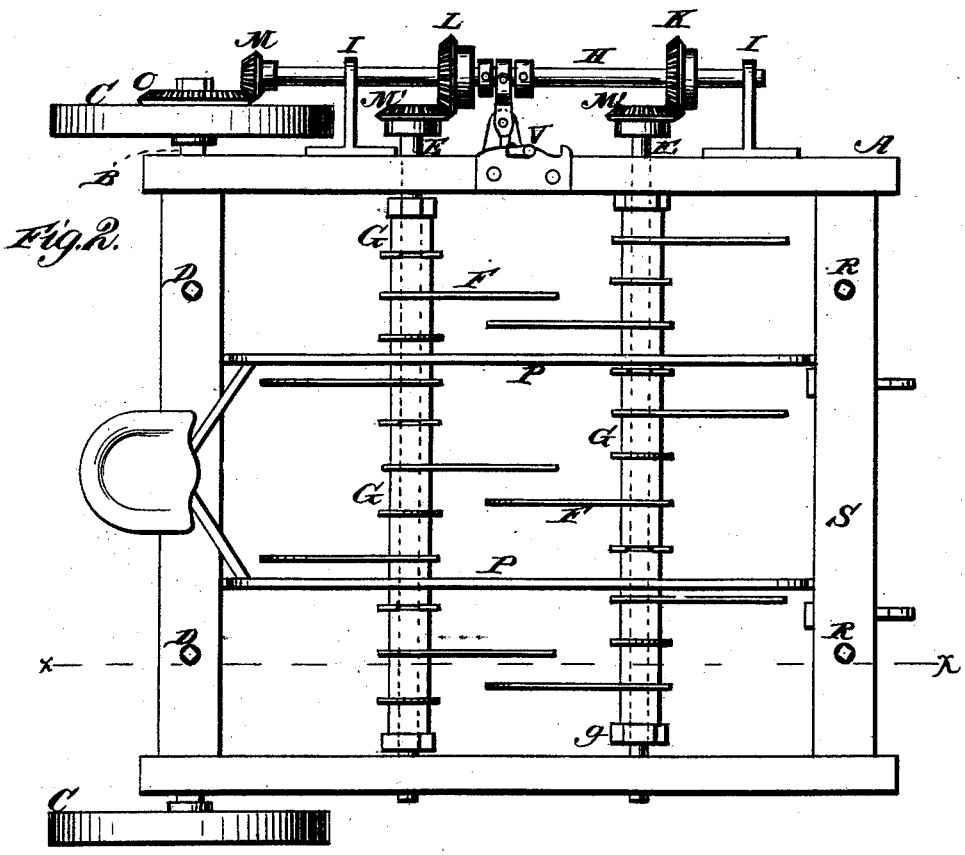

Figure 1 of the drawings is a representation of a section of my harrow through line $x$ $x$ of Fig. 2. Fig. 2 is a plan view of the same.

The nature of this invention relates to an improvement in harrows, as will be fully described in the following specification, and particularly set forth in the claims.

A designates the harrow-frame, which is composed of four wooden timbers jointed together. B is the axle-tree of the two wheels C C. This is secured to the rear timber of the frame by bolts D D, passed up through screw-threaded plates $a$ in the under face of the rear timber, and having their upper ends constructed to receive a wrench, by which the rear timber, or end, rather, of the frame A can be raised or lowered at pleasure. By means of similar bolts, R, at the front end of the frame the bar Q may be adjusted with relation to that end of the frame. By this construction the frame carrying the rotary cutters or teeth may be so adjusted as to permit the harrow to be transported from field to field or place to place without causing the teeth to come in contact with the ground. A crank-wrench constructed for the purpose is preferred for operating the screw-bolts D and R.

The shafts E E are rectangular in form, and have secured upon them teeth F, having rectangular recesses or slots $f$ in their upper ends, said recesses $f$ embracing three sides of the shafts E E, being separated by rectangular collars G, which are pressed against the sides of the teeth at their upper ends by screw-nuts $g$, located at opposite ends of the shafts E E. The object of this construction is to permit the ready removal of a broken or damaged tooth, F, and the insertion of a new or sound one, which operation is performed by simply loosening one of the nuts $g$, to release the pressure upon the teeth, which will permit the removal of the damaged tooth and the insertion of a sound one, when the nut $g$ may be again tightened to hold the tooth firmly in place upon the shaft, thereby obviating the necessity which has heretofore been incurred of removing the teeth and collars adjacent to the damaged tooth to replace it by a sound one.

The mechanism for operating the shafts which carry the teeth is as follows: H is a shaft journaled in bearings I, which are secured to the harrow-frame. This shaft is provided with the three beveled gear-wheels K L M. The gear-wheels K L intermesh with similar wheels, M' M', upon the shafts E, while the gear-wheel M intermeshes with the beveled gear-wheel O upon one of the wheels C.

P P are two bars curved at their ends and secured to the axle B at the rear of the harrow, and to the bar Q, which is supported under the front timber of the harrow-frame by bolts R.

In the drawings, Fig. 1 illustrates the bar Q in section, which will be sufficient to show that it extends from end to end of the timber S. By means of bolts R, which are screwed into timber S, this bar Q may be adjusted relatively to the timber S, and hence the wheels T, which are supported by said bar by brackets U, will be raised or lowered.

The shaft H is arranged to move in its bearings, so that by means of a lever, V, it may be operated so as to throw the gear-wheels upon it in or out of connection with the gear-wheels upon the shafts or axles upon which the harrow-teeth are mounted.

What I claim is—

1. In a harrow, the rectangular shafts E E, provided with the rectangular collars G G, in combination with the slotted removable teeth F and the nuts $g$ $g$, substantially as and for the purposes set forth.

2. In a wheel-harrow, the frame A, constructed as described, in combination with axle B, bar Q, bolts D and R, and the curved bars P P, substantially as and for the purposes set forth.

3. In a wheel-barrow, the combination of the frame A, provided with plates *a*, with the bar Q, having bolts R, and caster-wheels T T, substantially as and for the purposes set forth.

In testimony that I claim the above I have hereunto subscribed my name in the presence of two witnesses.

STEPHEN D. GIBSON.

Witnesses:
J. J. GLEDHILL,
GEO. GIBSON.